Oct. 8, 1940.    G. A. TINNERMAN    2,217,574
MOLDING CONSTRUCTION
Original Filed April 15, 1939
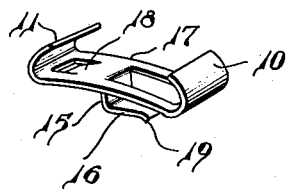
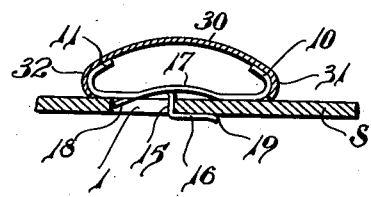
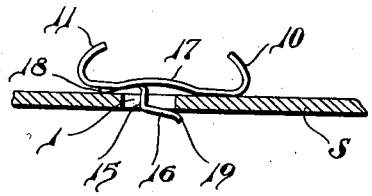
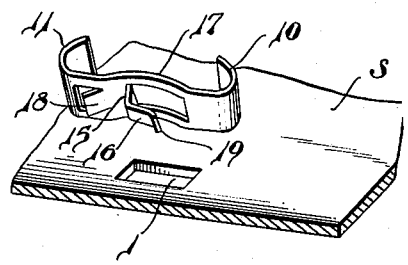
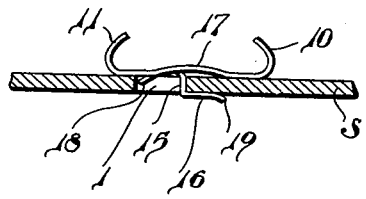
Inventor
GEORGE A. TINNERMAN
By H. G. Lombard
Attorney Patented Oct. 8, 1940

2,217,574

UNITED STATES PATENT OFFICE 2,217,574

MOLDING CONSTRUCTION

George A. Tinnerman, Rocky River, Ohio, assignor, by mesne assignments, to Tinnerman Products, Inc., Cleveland, Ohio, a corporation of Ohio Original application April 15, 1939, Serial No. 268,085. Divided and this application August 1, 1939, Serial No. 287,811

6 Claims. (Cl. 189—88)

This invention relates to a molding construction or the like embodying one or more fastening devices in the form of substantial retainers adapted for ready application to an apertured supporting structure to provide the same with means for securing a cooperating part thereto or for the purpose of securing another structure, object or article of manufacture to said supporting structure. The present application is a division of prior copending application Serial Number 268,085, filed April 15, 1939 and since issued as Patent Number 2,168,721, August 8, 1939.

More particularly, this invention is directed to a molding construction or the like comprising an improved form of substantial retainer provided with attaching means which may be readily interlocked to a sheet metal supporting structure, for example, by a simple operation taking place entirely from one side thereof, and including means for retaining a cooperating object or part, such as a molding or the like finishing object in applied mounted position on such supporting structure.

A primary object of the invention is to provide a molding construction or the like comprising a sheet metal fastening device of this character in the form of a substantial retainer that may be inexpensively constructed with an improved type of attaching means by which the device may be easily and quickly secured in fastening position in interlocked engagement with the supporting structure, and substantially positively locked in such fastening position against inadvertent disconnection or accidental removal without requiring access to the rearward side of the supporting structure and without the use of extraneous bolts, screws, rivets, welding or the like attaching means.

Another principal object of the invention is to provide a molding construction or similar installation embodying a fastening device in the form of an improved type of retainer which may be interlocked to a supporting structure by an operation taking place entirely from the forward side thereof by means of an attaching finger provided thereon which may be inserted in a hole in said structure and positioned in securing engagement therewith simply by sliding the retainer to final applied position in which it is adapted to mount a molding or the like object or article of manufacture in desired position on said supporting structure.

A more specific object is for the provision of such a molding construction or the like embodying a retainer provided with an improved form of attaching means comprising distinct, cooperating attaching finger and locking detent elements, the attaching finger being inserted in an assembling opening in a supporting structure and positioned in locking engagement therewith by sliding the retainer to its final applied position in which the locking detent thereon serves to maintain the same in positive locked assembled relation on said supporting structure.

Still another object of the invention is to provide a molding construction embodying a retainer device having such attaching means in which the locking detent, in the applied fastening position of the device, is designed to engage in the assembling opening or in a different aperture in the supporting structure to prevent retrograde sliding movement and inadvertent disconnection or displacement of the retainer from applied fastening position.

Further objects and advantages and other new and useful features in the construction, arrangement and general combination of parts of the invention will be readily apparent to those skilled in the art as a description thereof proceeds with reference to the accompanying drawing in which like reference characters designate like parts throughout the same, and in which:

Fig. 1 is a perspective of the improved molding construction retainer per se;

Fig. 2 shows in elevation the retainer of Fig. 1 as it is initially applied to attached position on an apertured supporting structure;

Fig. 3 is a view similar to Fig. 2 showing the retainer in fully attached position;

Fig. 4 is a sectional view of a completed molding construction embodying the retainer attached to the supporting structure as shown in Fig. 3; and, Fig. 5 shows in perspective a fragment of the supporting structure as prepared with a preferred form of opening for attaching the retainer shown about to be applied thereto.

Referring now more particularly to the drawing, it will be understood that the molding construction of the present invention is one of the general character in which a trim strip, beading, or the like finishing object may be mounted onto a supporting structure by an operation taking place entirely from the forward or readily accessible side thereof. The invention, therefore, is particularly suited for use in installations involving a blind location in which the rearward side of the supporting structure is not conveniently or readily accessible for attaching a retainer used in the mounting of a molding or other finishing object onto the supporting structure.

In accordance with the present invention, the retainers are provided in the manner of substantial clip devices comprising an attaching means and spring arm holding means, the attaching means of the retainer being adapted to be easily and quickly applied to substantially locked fastening position on the supporting structure from the forward side thereof whereupon the molding or other finishing object may then be applied to the holding arms of the retainer in fully mounted position on the supporting structure by an operation likewise taking place from the forward side thereof. Thus there is no necessity for access to the rearward side of the supporting structure as in heretofore known arrangements in which the retainers are attached by bolt and nut fastenings required to be secured together from both sides of the supporting structure.

The preferred form of retainer device shown in Fig. 1, is constructed most economically from a relatively small, inexpensive blank of sheet metal best provided in the manner of a simple, rectangular section severed from ordinary strip stock without loss or waste of material whatsoever. Any suitable sheet metal may be employed but preferably of a spring metal nature such as spring steel or cold rolled steel having spring characteristics. On either side of the approximate mid-portion of the blank, substantial spring arms 10, 11 are provided in a manner to permit the molding or other finishing object to be sprung thereon in mounted position relative to the supporting structure, as shown in Fig. 4. The supporting structure, designated generally S, may be of any suitable material such as sheet metal, wood, fiber board, or the like; however, inasmuch as the instant invention is employed mainly in metallic structures, the supporting structure is usually in the form of a metallic panel or plate-like element.

As best seen in Fig. 5, in order to adapt the supporting structure S for use with a retainer device in accordance with the invention, there is provided an assembling opening of any suitable outline but preferably in the manner of simple rectangular slot 1. It will be understood that a suitable number of such openings are prepared for the required retainers to be used, the same being provided in predetermined spaced relation on the supporting structure along the path which the molding or other finishing object to be mounted by the retainers extends in mounted position.

The body of the retainer, Fig. 1, includes an attaching portion designed to hold the same in self-sustained position on the supporting structure preparatory to the application of the molding or the like part thereto in mounting such part on the supporting structure entirely from the forward side thereof. The attaching portion comprises an attaching finger 15, including a hook or lug 16, struck and formed from the fastener body which is otherwise arched or bowed as at 17 in the area of such attaching finger, said lug 16 extending generally parallel to the fastener body and being spaced therefrom in normal untensioned relation, a distance somewhat less than the thickness of the supporting structure. A locking detent 18 of any suitable character is provided preferably by means of a small slit portion which is pressed out of the plane of the body such that the free end of the detent presents a relatively sharp shoulder designed to positively engage the side wall of an aperture in the supporting structure. The engaging point of such detent is preferably spaced from the effective shoulder portion 15 of the attaching finger a distance substantially equal to or slightly less than that between the end walls of the assembling opening or slot 1, in the supporting structure, to firmly and rigidly engage therein in the applied fastening position thereof, as presently to be described.

Accordingly, with the retainer thus provided and the supporting structure prepared with an assembling opening 1, Fig. 5, the retainer may be easily and quickly attached to positive locked engagement with the supporting structure simply by inserting the lug 16 of the attaching finger thereof in such assembling opening substantially as shown in Fig. 2. Preferably a flared lip 19 formed from the extremity of said lug 16 is provided to facilitate this initial step in applying the attaching finger to the assembling opening. By depressing the arched body portion 17 and simultaneously sliding the retainer forward, the lug 16 of the attaching finger will clear the underside of the supporting structure and permit the retainer to be advanced to its fully applied fastening position to the point at which the shoulder 15 of the attaching finger engages the adjacent end wall of said assembling slot 1, substantially as shown in Fig. 3. At this position, the locking detent 18 is also received in the assembling slot in engagement with the opposite end wall thereof since it is provided with a proper spacing from the shoulder 15 of the attaching finger for this purpose and otherwise cooperates therewith in the assembling opening to lock the fastener in fully applied position on the supporting structure. Thus the extremity of the locking detent 18 and shoulder 15 of the attaching finger cooperate to engage the opposite end walls of the assembling slot and thereby also serve to prevent endwise displacement or rotative shifting movement of the retainer from final applied position. In this relation, the edges of the locking detent are disposed in substantial abutting engagement with the adjacent sidewalls of the assembling slot as a further means maintaining the retainer in fixed, non-rotative applied position on the supporting structure.

A most important advantage of a retainer of this character having a bowed or arched body 17 from which the attaching finger 15, depends, resides in the fact that the same is thus provided with added resilience and is thereby admirably suited for use with supporting structures of different thicknesses since such body may be depressed as necessary to permit the lug 16 of the attaching finger to positively engage at the reverse side of any suitable supporting structure in self-sustained position thereon substantially as shown in Fig. 3. It is to be understood, however, that though such an arched body 17 is preferable, it is not absolutely essential; also, the locking detent need not necessarily engage in the same assembling opening in the supporting structure as the attaching finger, but may be designed to be received in a separate recess therein to lock the fastener in applied fastening position in any manner equivalent to that shown and described. The present arrangement however is most practical in that the elongated assembling slot 1, requires only a single opening to be punched, and by designing both the attaching finger and locking detent to seat in such slot in the applied fastening position of the device as aforesaid, the attachment of the retainers onto the supporting structure may be performed with the greatest speed and facility.

In the foregoing manner a suitable number of retainers are attached to the supporting structure as shown in Fig. 3 along the path which the molding or other finishing object extends in mounted position. The molding 30 may be provided of any suitable cross-section, but usually in the form of a substantial channel shape or beading including longitudinal inturned flanges 31, 32, adapted to be sprung onto the retainers by substantial snap fastening engagement with the spring arms 10, 11 thereof.

Preparatory to mounting the molding as shown in Fig. 4, the said spring arms 10, 11, extend longitudinally of the inturned flanges 31, 32, thereof and accordingly, when the molding is placed thereon and pressed downwardly, said spring arms 10, 11 are caused to flex gradually inwardly toward each other until the flanges 31, 32, of the molding pass over and firmly and rigidly engage the substantial shoulders presented by said spring arms. This action otherwise is preferably provided for in the manner of a substantial snap fastening engagement by which the molding or other trim material is easily and quickly secured to the retainers in fully mounted position on the supporting structure in a minimum of time and effort.

While the invention has been described in detail with a specific example, such example is intended as an illustration only, since it will be apparent to those skilled in the art that other modifications in the construction, arrangement and general combination of parts thereof may be devised without departing from the spirit and scope of the invention. The present embodiment is therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. In a molding construction or the like, the combination of a trim object, a support having an assembling opening, and a platelike retainer mounting said trim object on the support, said retainer comprising a sheet metal body provided with cooperating resilient shoulders to which said trim object is applied in a direction generally normal to said sheet metal body, and attaching means comprising an attaching finger extending in generally parallel and spaced relation to the retainer body and a locking detent cooperating with said attaching finger, said retainer body seating on one side of said support with said attaching finger received in said assembling opening therein and extending in close, substantially flush engagement with the opposite side of said support, said detent extending downwardly from said sheet metal body to engage a portion of said support below the surface thereof and prevent withdrawal of said attaching finger from said assembling opening.

2. In a molding construction or the like, the combination of a trim object, a support having an assembling opening, and a platelike retainer mounting said trim object on the support, said retainer comprising a sheet metal body provided with cooperating resilient shoulders to which said trim object is applied in a direction generally normal to said sheet metal body, and attaching means comprising an attaching finger extending in generally parallel and spaced relation to the retainer body and a locking detent cooperating with said attaching finger, said retainer body being of generally bowed configuration and seating on one side of said support with said attaching finger received in said assembling opening in the support and extending in close, substantially flush engagement with the opposite side of said support under tension supplied by said generally bowed body of the retainer, said detent extending downwardly from said sheet metal body to engage a portion of said support below the surface thereof and prevent withdrawal of said attaching finger from said assembling opening.

3. In a molding construction or the like, the combination of a trim object, a support having an assembling opening, and a platelike retainer mounting said trim object on the support, said retainer comprising a sheet metal body provided with cooperating resilient shoulders to which said trim object is applied in a direction generally normal to said sheet metal body, and attaching means comprising cooperating attaching finger and locking detent elements pressed from said sheet metal retainer body with said attaching finger extending in generally parallel and spaced relation to the retainer body, said retainer body seating on one side of said support with said attaching finger received in said assembling opening therein and extending in close, substantially flush engagement with the opposite side of said support, said detent extending downwardly from said sheet metal body to engage the wall of said assembling opening and prevent withdrawal of said attaching finger from said assembling opening.

4. In a molding construction or the like, the combination of a trim object, a support having an assembling opening, and a platelike retainer mounting said trim object on the support, said retainer comprising a sheet metal body provided with resilient bent portions defining cooperating shoulders to which said trim object is applied in a direction generally normal to said sheet metal body, and attaching means comprising an attaching finger extending in generally parallel and spaced relation to the retainer body and a locking detent cooperating with said attaching finger, said retainer body seating on one side of said support with said attaching finger received in said assembling opening and extending in close, substantially flush engagement with the opposite side of said support, said detent extending downwardly from said sheet metal body to engage a portion of said support below the surface thereof and prevent withdrawal of said attaching finger from said assembling opening.

5. In a molding construction or the like, the combination of a trim object, a support having an assembling opening, and a platelike retainer mounting said trim object on the support, said retainer comprising a sheet metal body having resilient bent portions defining cooperating shoulders to which said trim object is applied in a direction generally normal to said sheet metal body, and attaching means comprising cooperating attaching finger and locking detent elements pressed from the sheet metal retainer body to project from the underface thereof with said attaching finger extending in generally parallel and spaced relation to said retainer body, said retainer body seating on one side of said support with said attaching finger received in said assembling opening in substantial engagement with the wall thereof and extending in close, substantially flush engagement with the opposite side of said support, said detent also engaging the wall of said assembling opening and preventing withdrawal of said attaching finger from said assembling opening.

6. In a molding construction or the like, the combination of a trim object, a support having an assembling opening, and a platelike retainer mounting said trim object on the support, said retainer comprising a sheet metal body having resilient bent portions defining cooperating shoulders to which said trim object is applied in a direction generally normal to said sheet metal body, and attaching means comprising cooperating attaching finger and locking detent elements pressed from the sheet metal retainer body to project from the underface thereof with said attaching finger extending in generally parallel and spaced relation to said retainer body, said retainer body being of generally bowed configuration and seating on one side of said support with said attaching finger received in said assembling opening in substantial engagement with the wall thereof and extending in close, substantially flush engagement with the opposite side of said support under tension supplied by said generally bowed body of the retainer, said detent also engaging the wall of said assembling opening and preventing withdrawal of said attaching finger from said assembling opening.

GEORGE A. TINNERMAN.